(12) United States Patent
Tyson

(10) Patent No.: US 10,168,679 B2
(45) Date of Patent: Jan. 1, 2019

(54) TOILET VENTILATION SYSTEM AND DEVICE

(71) Applicant: Darrin P. Tyson, Brandon, FL (US)

(72) Inventor: Darrin P. Tyson, Brandon, FL (US)

( * ) Notice: Subject to any disclaimer, the term of this patent is extended or adjusted under 35 U.S.C. 154(b) by 0 days.

(21) Appl. No.: 15/374,761

(22) Filed: Dec. 9, 2016

(65) Prior Publication Data

US 2018/0163384 A1    Jun. 14, 2018

(51) Int. Cl.
- *A47K 13/30* (2006.01)
- *E03D 9/05* (2006.01)
- *G05B 15/02* (2006.01)
- *F24F 1/00* (2011.01)

(52) U.S. Cl.
CPC ............ *G05B 15/02* (2013.01); *A47K 13/307* (2013.01); *E03D 9/05* (2013.01); *F24F 1/00* (2013.01)

(58) Field of Classification Search
CPC .............................. E03D 9/052; A47K 13/307
See application file for complete search history.

(56) References Cited

U.S. PATENT DOCUMENTS

| | | | |
|---|---|---|---|
| 2,058,436 A | 10/1936 | Friel | |
| 2,098,208 A | 11/1937 | Madden | |
| 2,112,772 A | 3/1938 | Greene | |
| 2,161,863 A | 6/1939 | Harbeke | |
| 2,297,035 A | 9/1942 | Svec | |
| 2,320,065 A | 5/1943 | Briscoe | |
| 2,389,165 A | 11/1945 | Riedele | |
| 3,703,010 A | 11/1972 | Russell | |
| 3,805,304 A | 4/1974 | Ikehata | |
| 3,999,225 A | 12/1976 | Ables | |
| 4,726,078 A | 2/1988 | Carballo et al. | |
| 4,984,305 A | 1/1991 | Boisvert | |
| 5,079,782 A | 1/1992 | Sim | |
| 5,353,443 A | 10/1994 | Sim | |
| 5,355,536 A | 10/1994 | Prisco | |
| 5,570,477 A | 11/1996 | Rodriguez | |
| 5,689,837 A | 11/1997 | Katona | |
| 5,715,543 A | 2/1998 | Sim | |
| 6,167,576 B1 | 1/2001 | Sollami | |
| 6,298,500 B1 | 10/2001 | Sollami | |
| 6,370,702 B1 | 4/2002 | Iddings | |
| 6,550,072 B1 | 4/2003 | Ware | |
| 6,772,449 B1 * | 8/2004 | Wolfe | A47K 13/307 4/213 |

(Continued)

*Primary Examiner* — Janie Loeppke

(74) *Attorney, Agent, or Firm* — IDP Patent Services; Olav M. Underdal

(57) ABSTRACT

A system for toilet ventilation, includes a ventilatable toilet, including a toilet body with a flush cavity; a ventilatable toilet seat, including a lid component, a ventilatable seat component with a ventilation channel and a ventilation aperture; a ventilation line; a ceiling ventilation unit, including a ventilation fan; a ventilation pump; and a ventilation control unit, including a processor, a non-transitory memory, an input/output component, a ventilation manager, and a data bus; such that the ventilation fan ventilates a bathroom; and the ventilatable toilet seat ventilates the toilet to reduce emission of odors. Alternatively, the toilet body can be ventilatable and mounted with a conventional toilet seat. The system can further include a ventilation control device.

27 Claims, 16 Drawing Sheets

System for Toilet Ventilation

(56) References Cited

U.S. PATENT DOCUMENTS

| | | | |
|---|---|---|---|
| 6,775,853 B1 * | 8/2004 | Szekely | A47K 13/307 4/213 |
| 6,795,980 B1 | 9/2004 | Ries | |
| 7,065,801 B1 | 6/2006 | Klepfer | |
| 7,120,942 B2 | 10/2006 | Kline et al. | |
| 7,162,751 B2 | 1/2007 | Mundt | |
| 7,644,450 B2 | 1/2010 | Lapossy | |
| 8,973,174 B2 * | 3/2015 | Palazzola | E03D 9/052 4/216 |
| 8,984,676 B2 | 3/2015 | Zheng | |
| 9,133,611 B2 | 9/2015 | Plugovoy | |
| 9,170,720 B2 * | 10/2015 | Plate | A47K 13/24 |
| 2002/0073482 A1 | 6/2002 | Hashemi | |
| 2005/0081285 A1 | 4/2005 | Mundt | |
| 2005/0138720 A1 | 6/2005 | Shim | |
| 2006/0085897 A1 | 4/2006 | Birdsong | |
| 2006/0248634 A1 | 11/2006 | Sollami | |
| 2007/0186334 A1 | 8/2007 | Carter et al. | |
| 2008/0034482 A1 | 2/2008 | Lehman | |
| 2008/0301865 A1 | 12/2008 | Hand | |
| 2009/0126089 A1 | 5/2009 | Smith | |
| 2010/0043128 A1 * | 2/2010 | Soldera | E03D 9/052 4/213 |
| 2011/0099697 A1 | 5/2011 | Weigart | |
| 2012/0186007 A1 | 7/2012 | Perez | |
| 2012/0227170 A1 * | 9/2012 | Ineson | A47K 13/307 4/347 |
| 2012/0255110 A1 | 10/2012 | Kao | |
| 2013/0097770 A1 | 4/2013 | Gallardo | |
| 2014/0090160 A1 | 4/2014 | Myburgh | |
| 2014/0165279 A1 | 6/2014 | Plugovoy | |
| 2014/0338114 A1 | 11/2014 | Zheng | |

\* cited by examiner

System for Toilet Ventilation

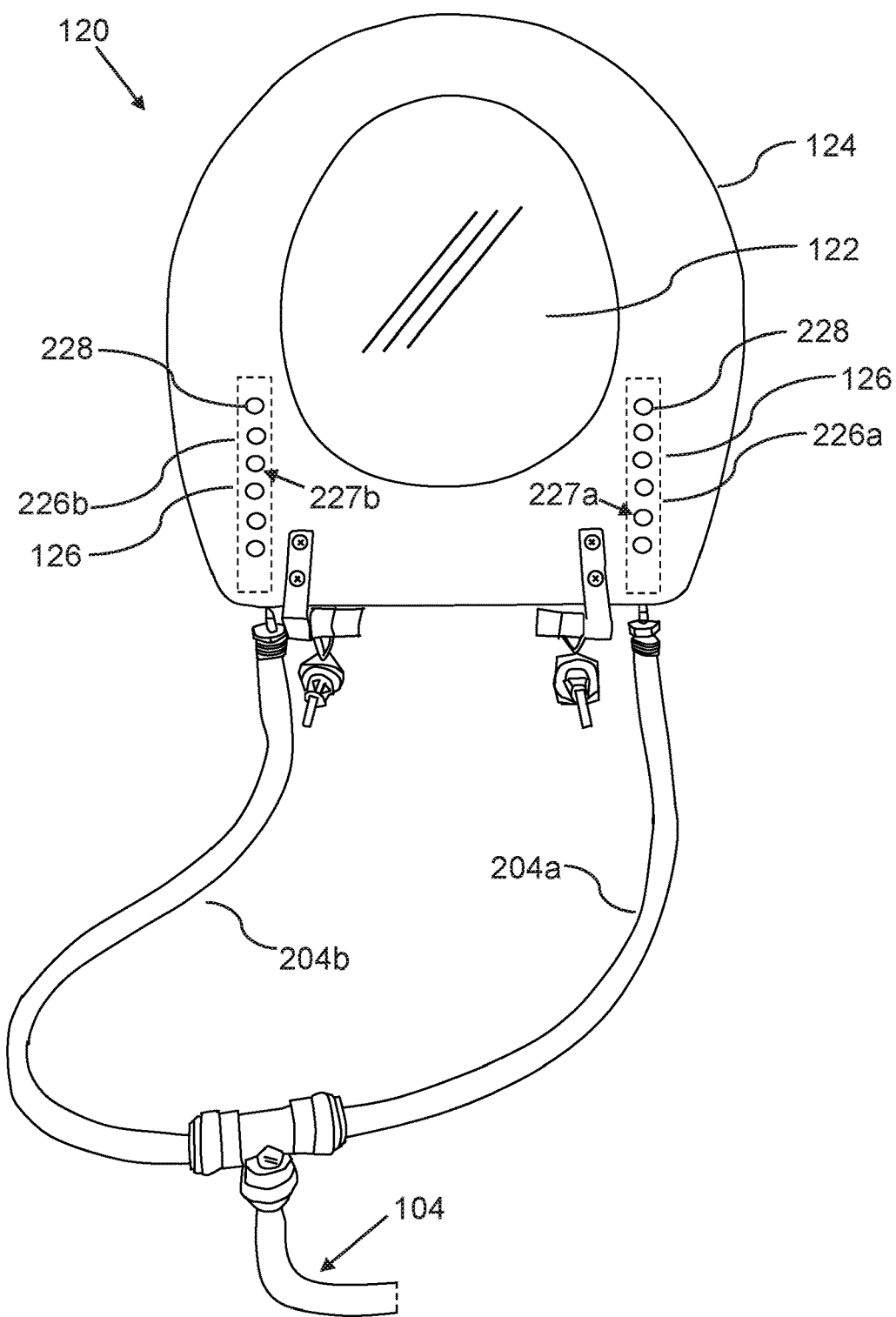

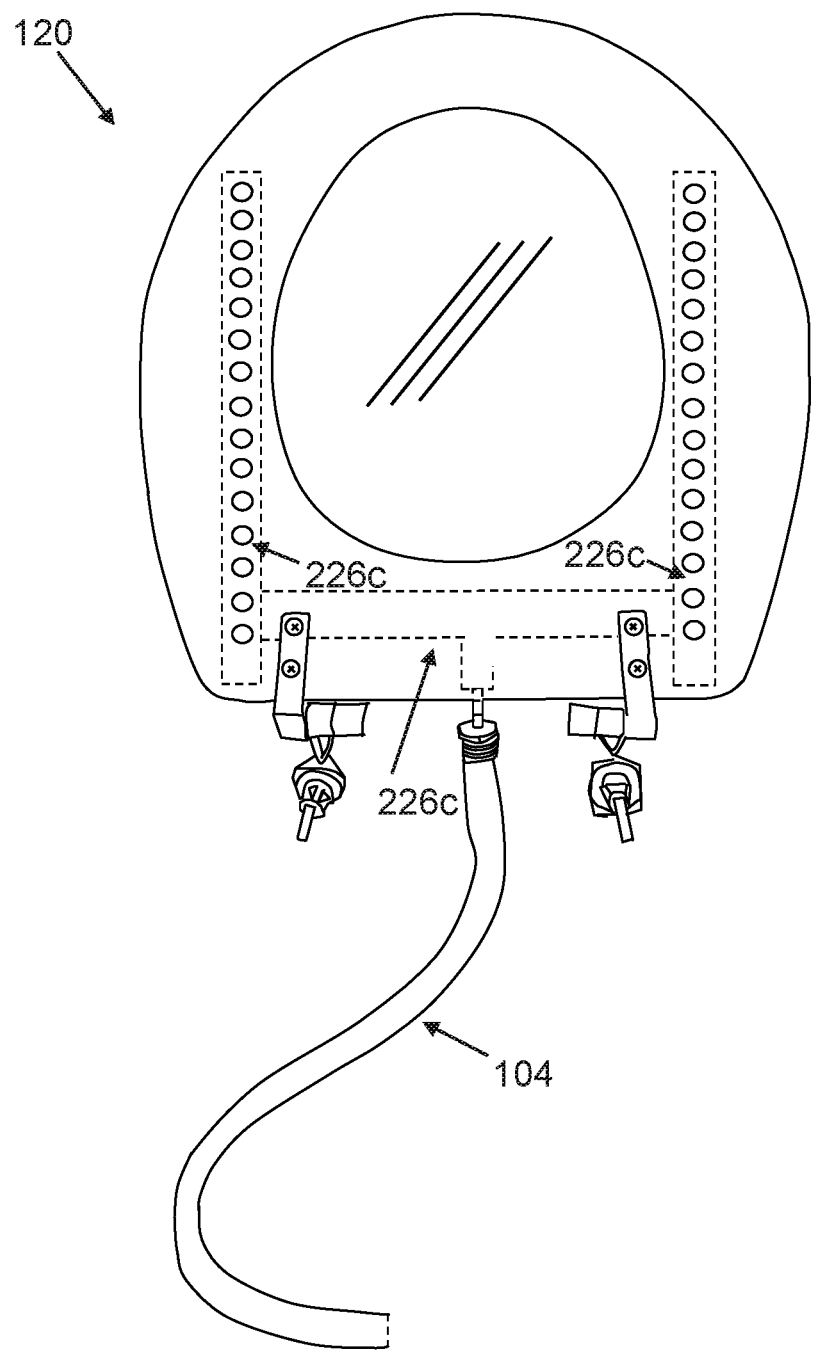

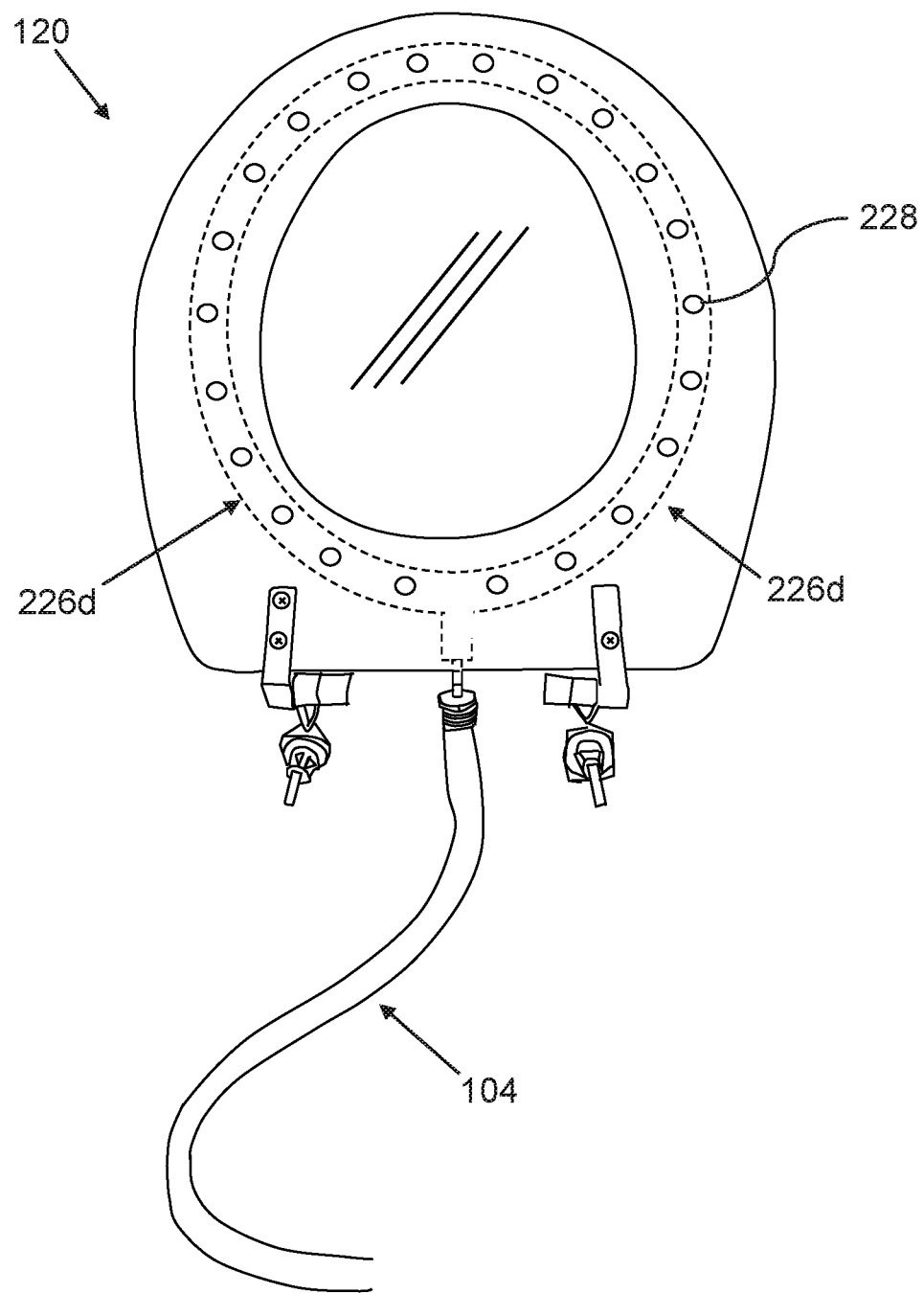

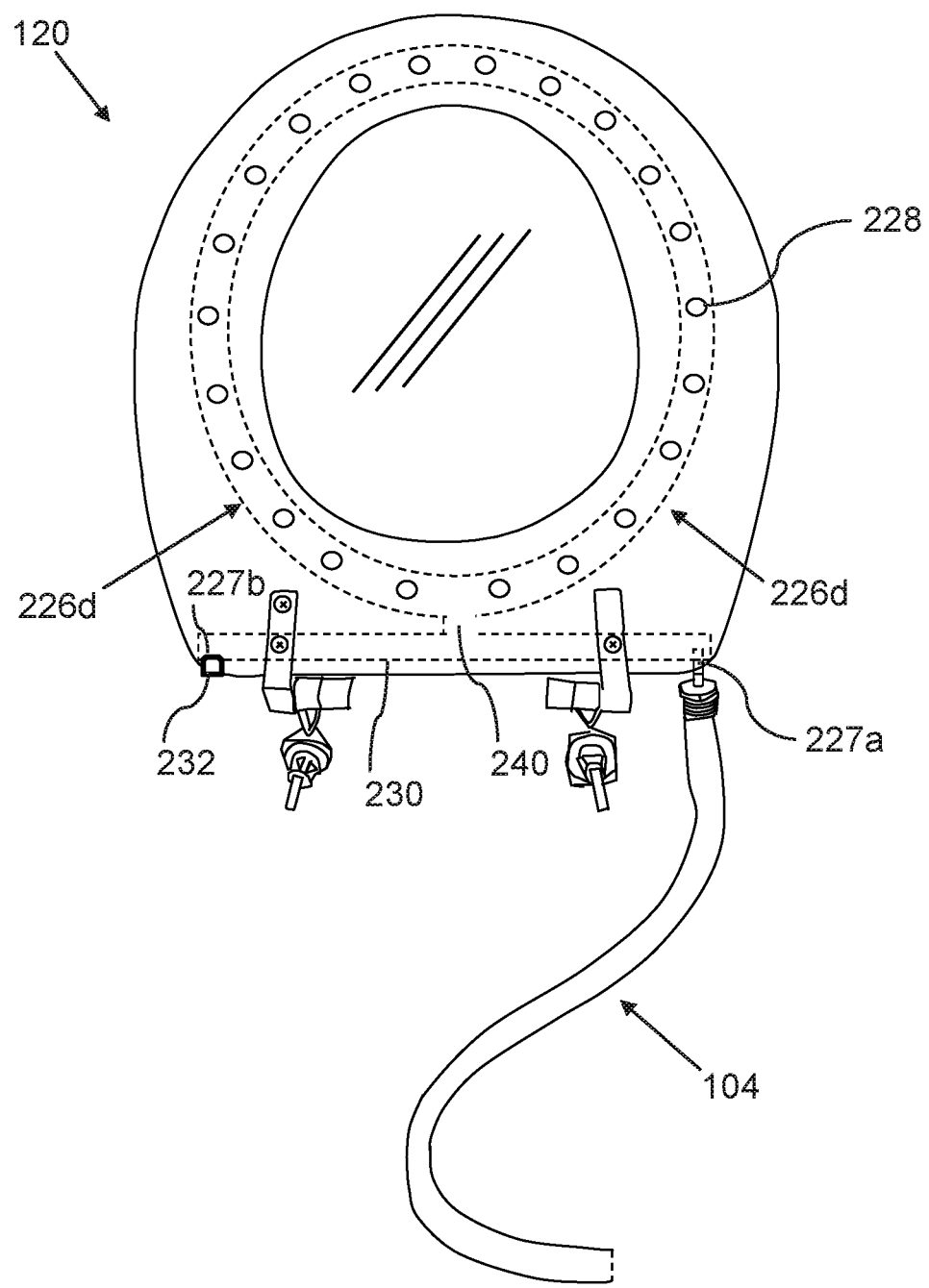

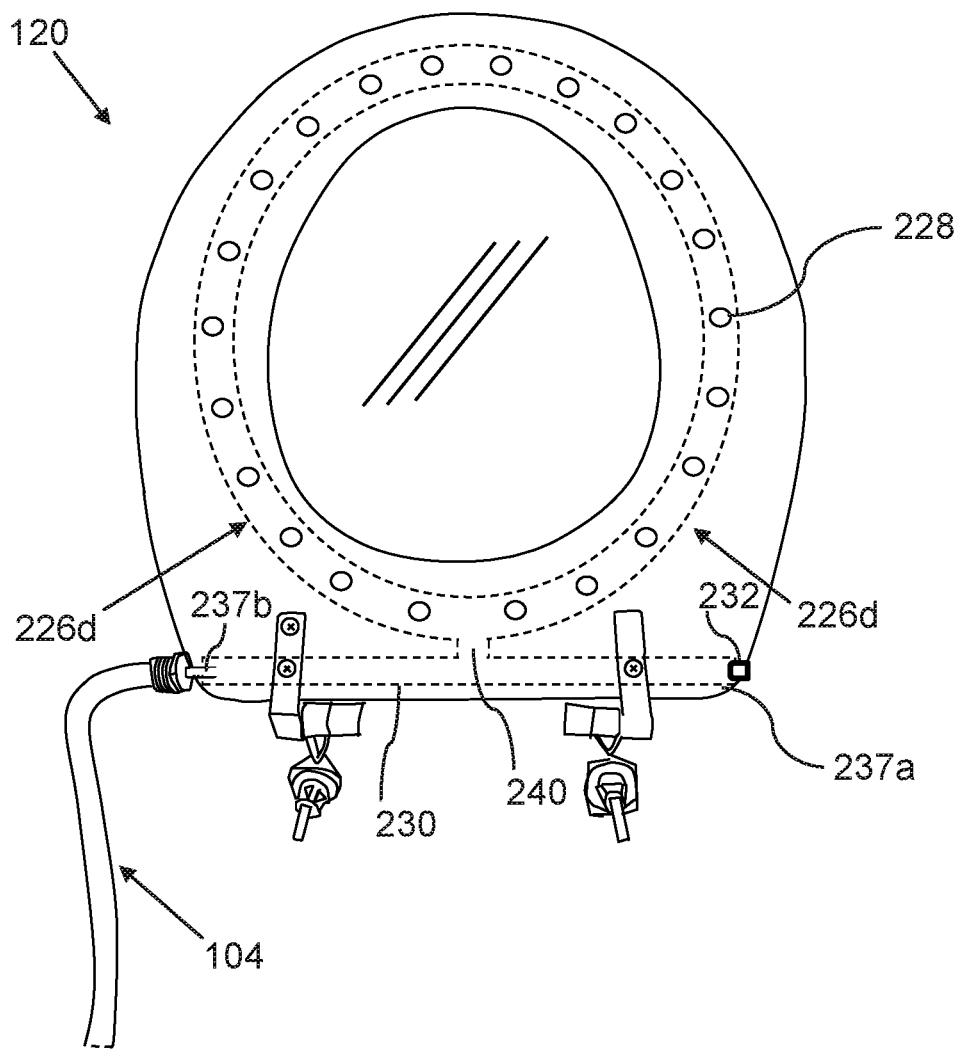

System for Ventilation Control

Ventilation Control Device

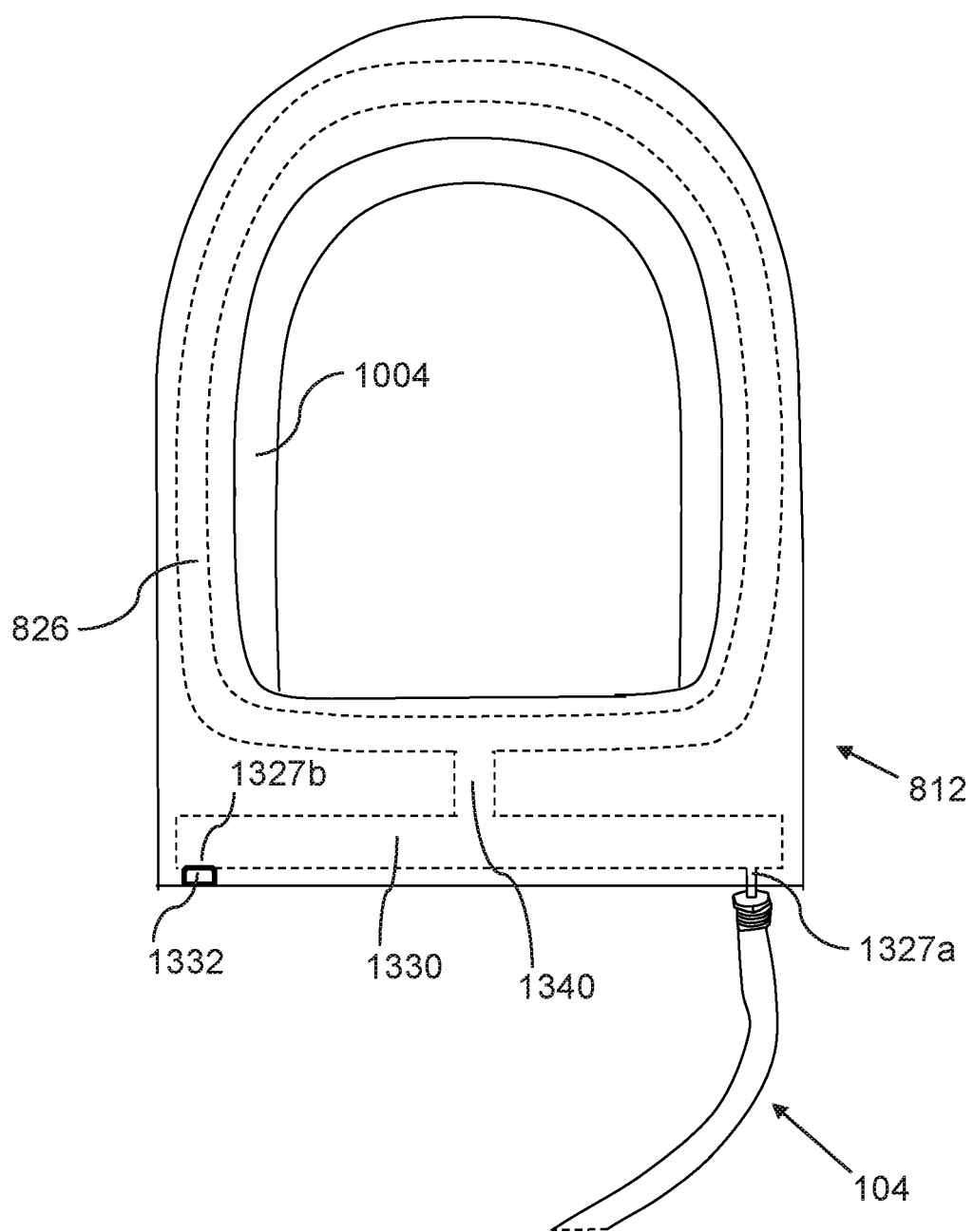

TOILET VENTILATION SYSTEM AND DEVICE

CROSS-REFERENCE TO RELATED APPLICATIONS

N/A

FIELD OF THE INVENTION

The present invention relates generally to the field of ventilation, and more particularly to methods and systems for ventilation of a toilet in a bathroom, in order to avoid or minimize emission of foul odors.

BACKGROUND OF THE INVENTION

Ventilation is common in bathrooms of residential building. However, such systems are commonly designed for ventilating high humidity and are often not efficient at reducing odor emissions.

Systems are available for reducing odor emissions from toilets, but such systems are typically expensive and complex, do not offer retro-fit installation, and are not designed to work in conjunction with existing ventilation systems.

As such, considering the foregoing, it may be appreciated that there continues to be a need for novel and improved devices and methods for ventilation of a toilet in a bathroom, in order to avoid or minimize emission of foul odors.

SUMMARY OF THE INVENTION

The foregoing needs are met, to a great extent, by the present invention, wherein in aspects of this invention, enhancements are provided to the existing model of toilet ventilation.

In an aspect, a system for toilet ventilation, can include:
a) a ventilatable toilet, including:
   a toilet body, comprising a flush cavity;
   at least one ventilation channel, which is an elongated cavity inside the ventilatable toilet, such that the ventilatable toilet comprises a rear entry aperture to the ventilation channel; and
   at least one ventilation aperture, which is configured to establish an airflow connection from the flush cavity to the ventilation channel;
b) a ventilation line, which is connected in a first end to the rear entry aperture of the ventilation channel; and
c) a ceiling ventilation unit, including:
   a ventilation fan, which is configured to ventilate a room, such that the ventilation fan is configured to connect to a ventilation shaft;
   a ventilation pump, comprising:
     an input connection, which is connected to a second end of the ventilation line; and
     an output connection, which is connected to the ventilation shaft;
wherein the ventilation fan is configured to ventilate the room; and
wherein the ventilatable toilet is configured to ventilate, whereby an emission of odors from the toilet is reduced In a related aspect, the ventilatable toilet can further include:
a ventilatable toilet seat, comprising
   a lid component; and
   a ventilatable seat component, such that the lid component is rotatably connected to the ventilatable seat component, the ventilatable seat component further comprising:
     the at least one ventilation channel, which is an elongated cavity which penetrates into the seat component from a rear end of the seat component, such that the seat component comprises the rear entry aperture to the ventilation channel; and
     the at least one ventilation aperture, which is an aperture on a bottom side of the seat component, which is configured to establish an airflow connection to the ventilation channel;
wherein the ventilatable toilet seat is mounted around the flush cavity of the toilet;
wherein the ventilatable toilet seat is configured to ventilate the ventilatable toilet, whereby an emission of odors from the ventilatable toilet is reduced.

In a related aspect, the toilet body can be configured as a ventilatable toilet body, further including:
   the at least one ventilation channel, which is an elongated cavity which penetrates into the ventilatable toilet body from a rear end of the ventilatable toilet body, such that the ventilatable toilet body comprises a rear entry aperture to the ventilation channel;
   the at least one ventilation aperture, which is an aperture on an inner side of the flush cavity of the ventilatable toilet body, which is configured to establish an airflow connection to the ventilation channel;
wherein the ventilatable toilet body is configured to ventilate the ventilatable toilet, whereby an emission of odors from the ventilatable toilet is reduced.

In a related aspect, the ceiling ventilation unit can further include:
   a ventilation control unit, which is connected to the ventilation fan and the ventilation pump;
   wherein the ventilation control unit is configured to control functions of the ventilation fan and the ventilation pump.

In a further related aspect, a ventilation control unit can include:
   a) A processor;
   b) A non-transitory memory;
   c) An input/output component; and
   d) A ventilation manager; all connected via
   e) A data bus;
   such that the ventilation manager controls functions of the ventilation fan and the ventilation.

In a further related aspect, the ventilation control unit can execute a ventilation program, such that the ventilation fan is activated for a predetermined first time period and the ventilation pump is activated for a predetermined second time period.

In a further related aspect, the toilet can further include a lid sensor, which is configured to detect an opening movement of the lid component of the ventilatable toilet seat, such that the ventilation control unit activates the ventilation pump when the opening movement of the lid component is detected.

In a further related aspect, the ceiling ventilation unit can further include a humidity sensor, such that the ventilation control unit receives a humidity measurement of a humidity level in the room, such that the ventilation control unit activates the ventilation fan when the humidity measurement exceeds a predetermined humidity threshold.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 2A is a bottom perspective view of a ventilatable toilet seat, according to an embodiment of the invention.

FIG. 2B is a bottom perspective view of a ventilatable toilet seat, according to an embodiment of the invention.

FIG. 2C is a bottom perspective view of a ventilatable toilet seat, according to an embodiment of the invention.

FIG. 2D is a bottom perspective view of a ventilatable toilet seat, according to an embodiment of the invention.

FIG. 2E is a bottom perspective view of a ventilatable toilet seat, according to an embodiment of the invention.

FIG. 13 is a top perspective view of a ventilatable toilet body, according to an embodiment of the invention.

DETAILED DESCRIPTION

Figure 1:
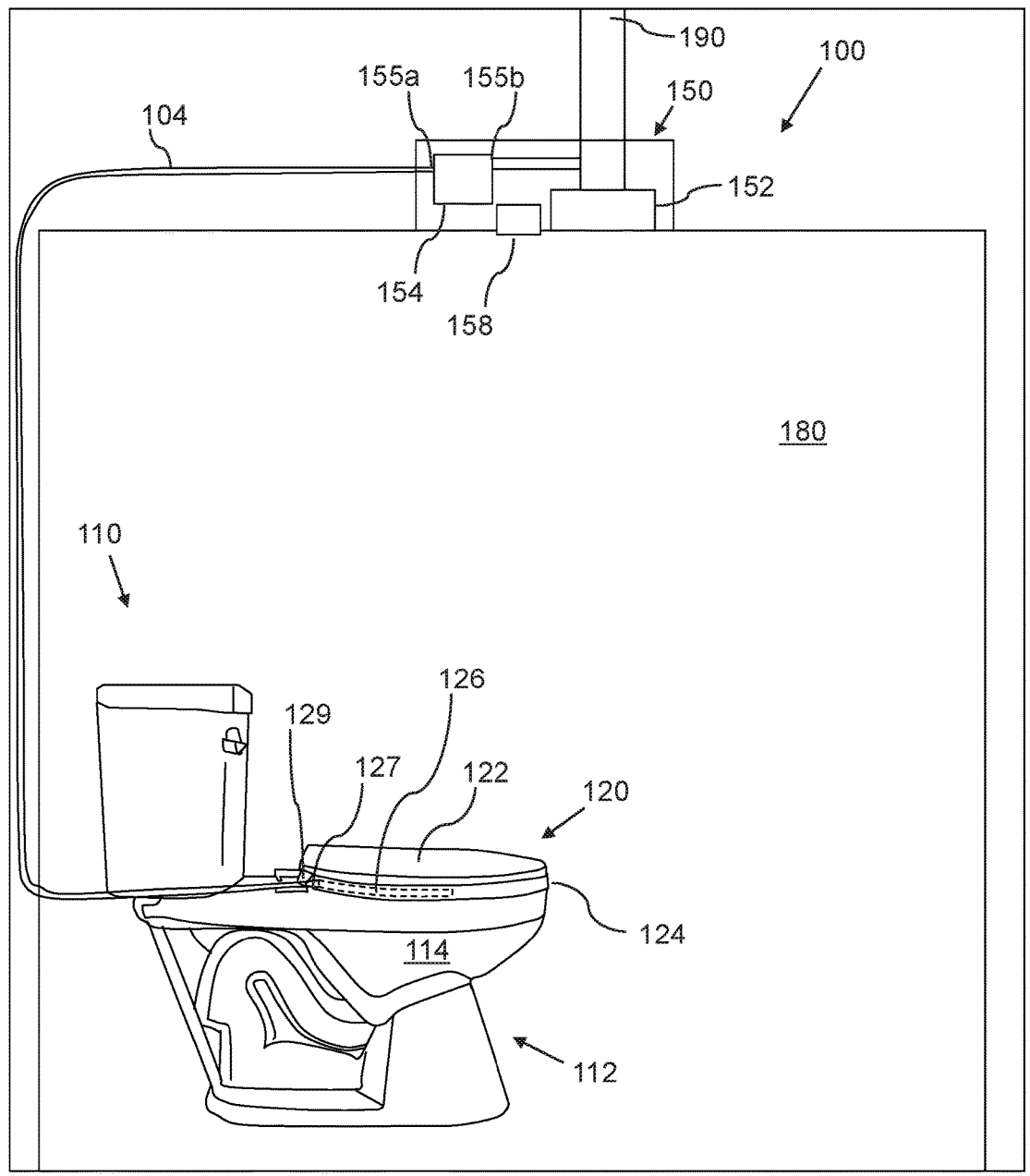
FIG. 1 is a schematic diagram illustrating a system for toilet ventilation, according to an embodiment of the invention.

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

In the following, we describe the structure of an embodiment of a system for toilet ventilation 100 with reference to FIG. 1, in such manner that like reference numerals refer to like components throughout; a convention that we shall employ for the remainder of this specification.

In an embodiment, as shown in FIGS. 1 and 2, a system for toilet ventilation 100 can include:
   a) a ventilatable toilet 110, comprising:
      a toilet body 112, comprising a flush cavity 114;
      at least one ventilation channel 126, which is an elongated cavity inside the ventilatable toilet, such that the ventilatable toilet comprises a rear entry aperture 127 to the ventilation channel 126; and
      at least one ventilation aperture, which is configured to establish an airflow connection from the flush cavity 114 to the ventilation channel 126;
   b) A ventilation line 104, which is connected in a first end to the rear entry aperture 127 of the ventilation channel 126; and
   c) A ceiling ventilation unit 150, comprising:
      i. A ventilation fan 152, which is configured to ventilate a room 180, such as a bathroom 180, such that the ventilation fan 152 is connected to a ventilation shaft 190;
      ii. A ventilation pump 154, comprising:
         an input connection 155a, which is connected to a second end of the ventilation line 104; and
         an output connection 155b, which is connected to the ventilation shaft 190;
   wherein the ventilation fan 152 is configured to ventilate the room 180; and
   wherein the ventilatable toilet 110 is configured to ventilate, whereby an emission of odors from the ventilatable toilet 110 is reduced.

In a related embodiment, as shown in FIGS. 1 and 2A, a system for toilet ventilation 100 can include:
   a) A ventilatable toilet 110, comprising:
      i. A toilet body 112, comprising a flush cavity 114; and
      ii. A ventilatable toilet seat 120, comprising
         1. A lid component 122; and
         2. A ventilatable seat component 124, such that the lid component 122 is rotatably connected to the ventilatable seat component 124, the ventilatable seat component 124 further comprising:
            At least one ventilation channel 126, which is an elongated cavity which penetrates into the seat component from a rear end of the seat component, such that the seat component comprises a rear entry aperture 127 to the ventilation channel 126;

At least one ventilation aperture 228, as shown in FIG. 2A, which is an aperture on a bottom side of the seat component, which is configured to establish an airflow connection to the ventilation channel;

wherein the toilet seat 120 is mounted around the flush cavity 114 of the toilet;

b) A ventilation line 104, which is connected in a first end to the rear entry aperture 127 of the ventilation channel 126; and c) A ceiling ventilation unit 150, comprising:
  i. A ventilation fan 152, which is configured to ventilate a room 180, such as a bathroom 180, such that the ventilation fan 152 is connected to a ventilation shaft 190;
  ii. A ventilation pump 154, comprising:
    an input connection 155a, which is connected to a second end of the ventilation line 104; and
    an output connection 155b, which is connected to the ventilation shaft 190;
  wherein the ventilation fan 152 is configured to ventilate the room 180; and
  wherein the ventilatable toilet seat 120 is configured to ventilate the toilet 110, whereby an emission of odors from the toilet 110 can be reduced.

In a related embodiment, FIG. 2A shown a bottom view of the ventilatable toilet seat 120, including ventilation apertures 228.

Figure 4:
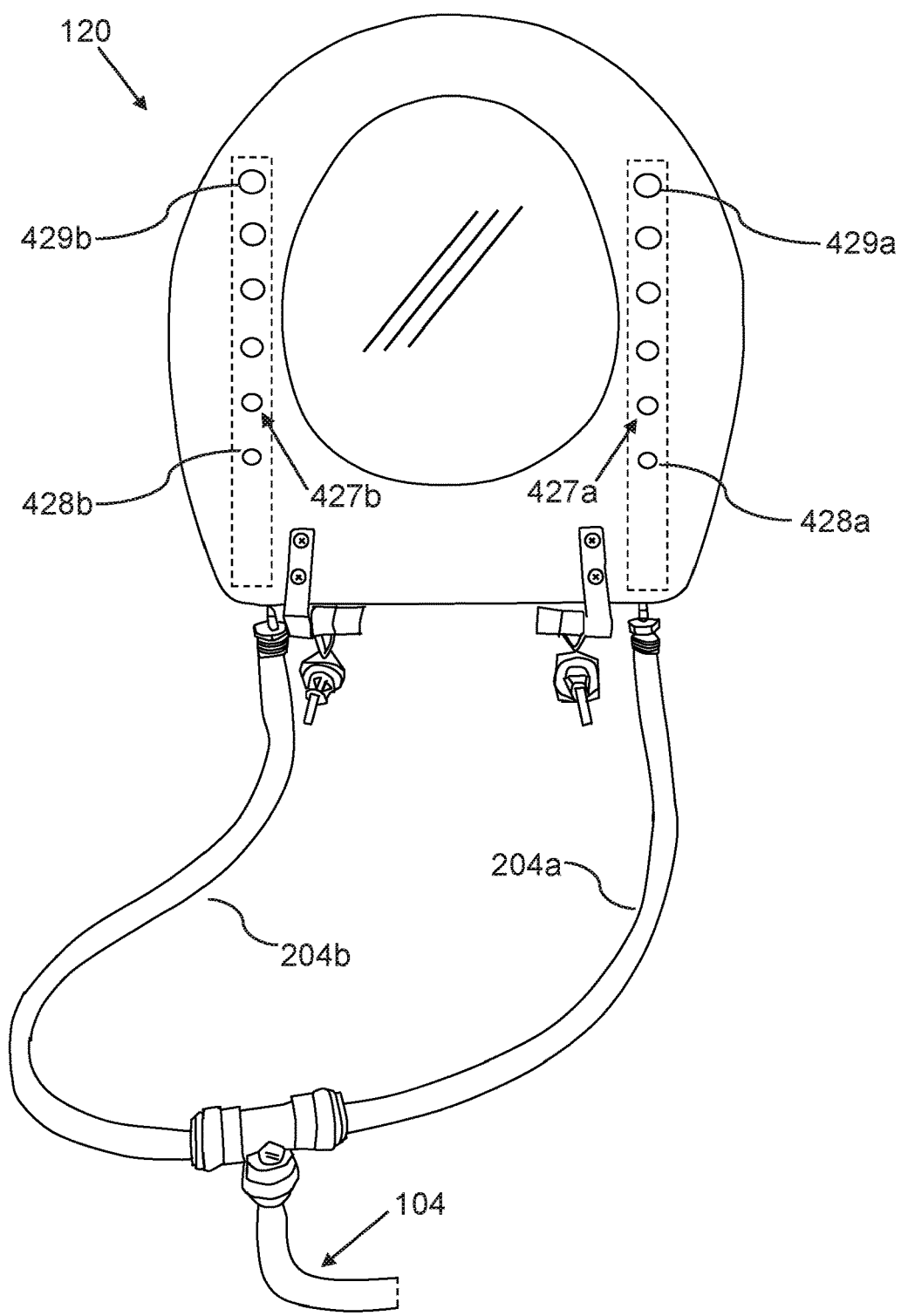
FIG. 4 is a bottom perspective view of a ventilatable toilet seat, according to an embodiment of the invention.

In a further related embodiment, as shown in FIGS. 2A and 4, the seat component 124 can include:

a) a first ventilation channel 226a;

b) a second ventilation channel 226b;

c) a first plurality of ventilation apertures 227a, which are apertures on a bottom side of the seat component, such that each ventilation aperture in the first plurality of ventilation apertures 227a is configured to establish an airflow connection to the first ventilation channel 226a, such that the first plurality of ventilation apertures 227a can be arranged in a linear array from a rear to a front of the seat component 124; and d) a second plurality of ventilation apertures 227b, which are apertures on a bottom side of the seat component, such that each ventilation aperture in the second plurality of ventilation apertures 227b is configured to establish an airflow connection to the second ventilation channel 226b, such that the second plurality of ventilation apertures 227b can be arranged in a linear array from a rear to a front of the seat component 124.

In a related embodiment, the ventilation line 104 can comprise a t-connector, such that the first end of the ventilation line 104 is split into right and left ventilation lines 204a 204b, which are connected to respectively the first and second ventilation channels 226a 226b.

In a related embodiment, as shown in FIG. 2B, the ventilation channel 126 can be configured as a connected ventilation channel 226c, extending to left and right sides of the ventilatable seat component 224, such that the ventilation line 104, is connected in a rear center point of the connected ventilation channel 226c.

In a related embodiment, as shown in FIG. 2C, the ventilation channel 126 can be configured as a connected ventilation channel 226d, which extends around the ventilatable seat component 224, for example as shown with a circular or ellipsoid shape, such that the ventilation apertures 228 are distributed along the connected ventilation channel; wherein the ventilation line 104, is connected in a rear center point of the connected ventilation channel 226d.

In another related embodiment, as shown in FIG. 2D, the ventilatable toilet seat 120 can further include a lateral distribution channel 230, which is an elongated cavity reaching from a right to a left side inside the ventilatable toilet seat 120, mounted behind the ventilation channel 126; such that the lateral distribution channel 230 is connected to a rear center of the ventilation channel 126, to permit a uniform air flow through the ventilation apertures 228; such that the rear entry aperture 127, can be connected to the lateral distribution channel 230, as a right rear entry aperture 227a, or a left rear entry aperture 227b, which are positioned in a rear side of respectively right and left ends of the lateral distribution channel 230;

whereby the lateral distribution channel 230 permits a rear right or left side connection of the ventilation line 104, while allowing a uniform airflow through the ventilation apertures 228.

FIG. 2D shows a right side connection, such that the ventilation line 104 is connected to a right rear entry aperture 227a, and a left rear entry aperture 227b is capped with a plug 232.

In related embodiments, the lateral distribution channel 230 can be directly connected to the ventilation channel 126, or can be connected via a connection channel 240.

In another related embodiment, as shown in FIG. 2E, the rear entry aperture 127 can alternatively be connected to the lateral distribution channel 1330, as a right side entry aperture 237a, or a left side entry aperture 237b, which are positioned in respectively right and left lateral sides of respectively right and left ends of the lateral distribution channel 230; whereby the lateral distribution channel 230 permits a rear right or left side connection of the ventilation line 104, while allowing a uniform airflow through the ventilation apertures 228. Such a configuration may allow the ventilatable toilet seat 120 to be opened with minimal crimping and/or bending of the ventilation line 104.

FIG. 2E shows a left side connection, such that the ventilation line 104 is connected to a left side entry aperture 237b, and a right side entry aperture 237a is capped with a plug 232.

Figure 3:
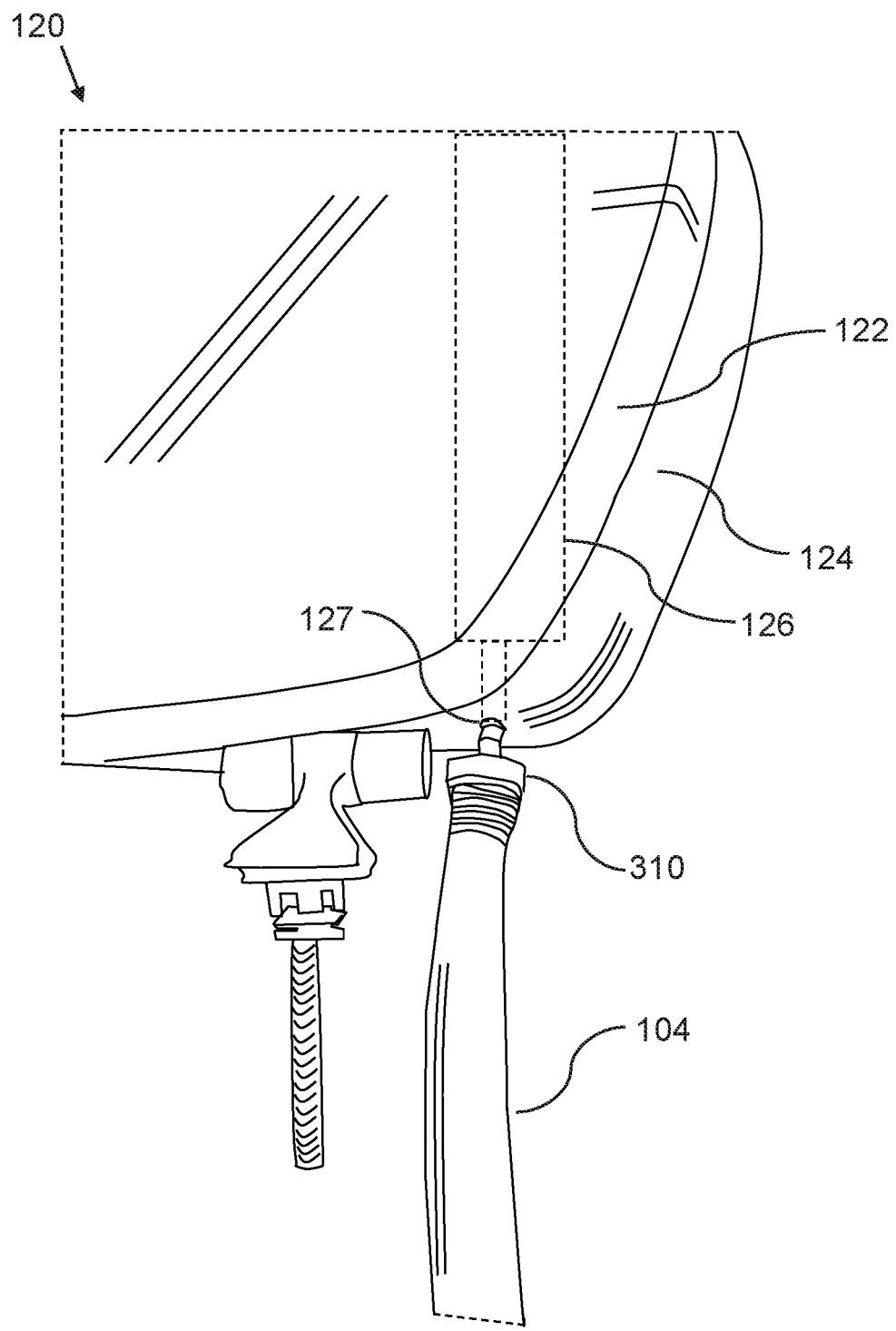
FIG. 3 is a top perspective view of a part of a ventilatable toilet seat, according to an embodiment of the invention.

In a related embodiment, FIG. 3 shows a connection of the ventilation line 104 to the rear entry aperture 127 to the ventilation channel 126. As shown the ventilation 104 can be connected to a ventilation connector 310, which penetrates through a rear side of the seat component 124, to establish a connection to the ventilation channel 126.

In a related embodiment, as shown in FIG. 4, a plurality of ventilation apertures 427a 427b can be arranged such that aperture diameter increases from a rear ventilation aperture to a front ventilation aperture, such that the plurality of ventilation apertures 427a 427b is configured to create a substantially uniform ventilation suction from a rear ventilation aperture 428 to a front ventilation aperture 429.

Figure 5:
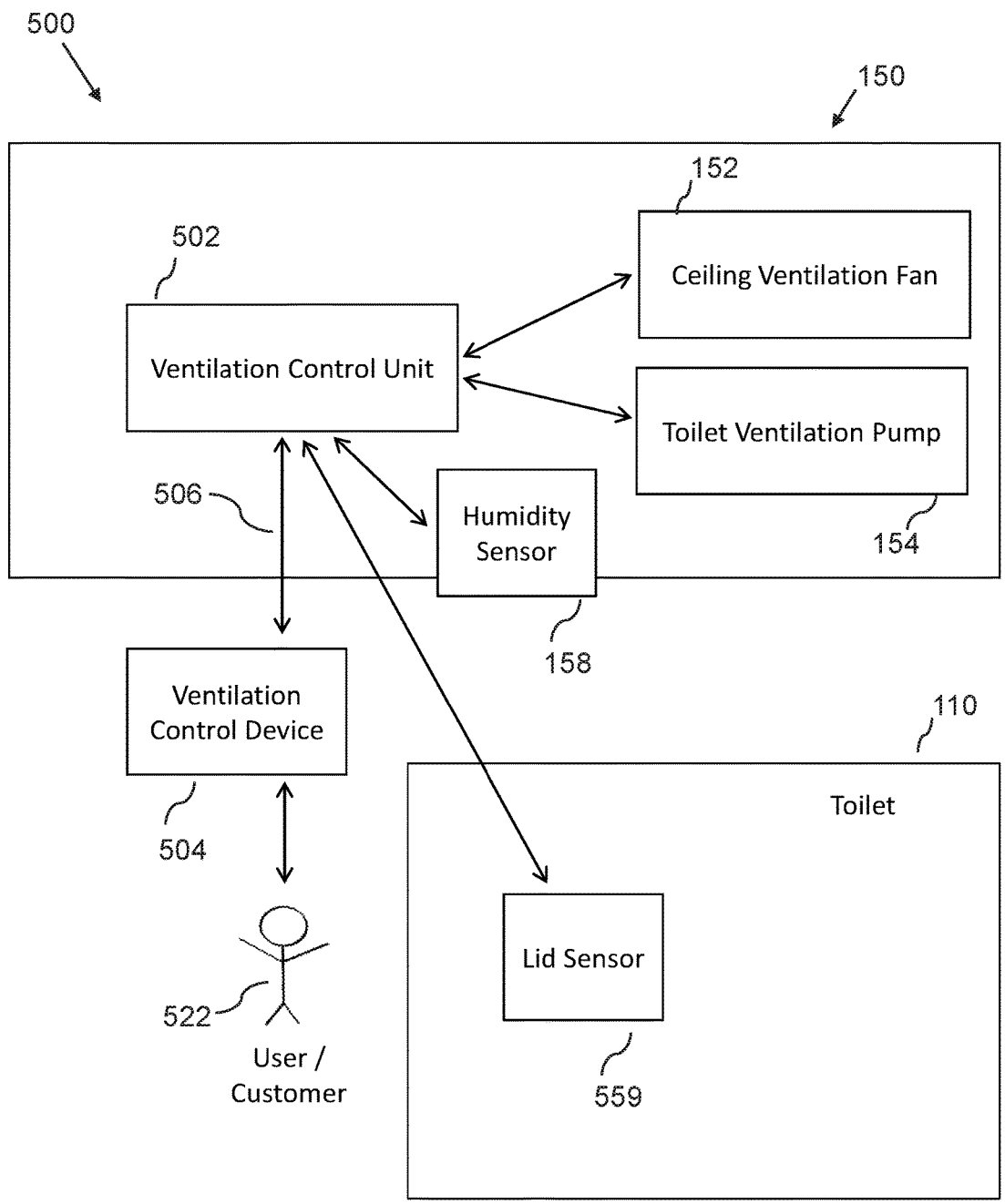
FIG. 5 is a schematic diagram illustrating a system for ventilation control, according to an embodiment of the invention.

In a related embodiment, as shown in FIG. 5, a system for ventilation control 500 can include:

a) A ceiling ventilation unit 150, comprising:
  i. A ventilation fan 152, which is configured to ventilate a room 180, such as a bathroom 180, such that the ventilation fan 152 is configured to be connected to a ventilation shaft 190;
  ii. A ventilation pump 154, comprising:
    an input connection 155a, which is configured to be connected to a ventilatable toilet seat of a toilet, via a ventilation line 104; and an output connection 155*b*, which is configured to be connected to the ventilation shaft 190; and iii. A ventilation control unit 502, which is connected to the ventilation fan 152 and the ventilation pump 154;

wherein the ventilation control unit 502 is configured to control functions of the ventilation fan 152 and the ventilation pump 154; and b) A ventilation control device 504, which is connected to the ventilation control unit 150;

wherein the ventilation control device 504 is configured to monitor and control functions of the ventilation control unit 150.

Figure 6:
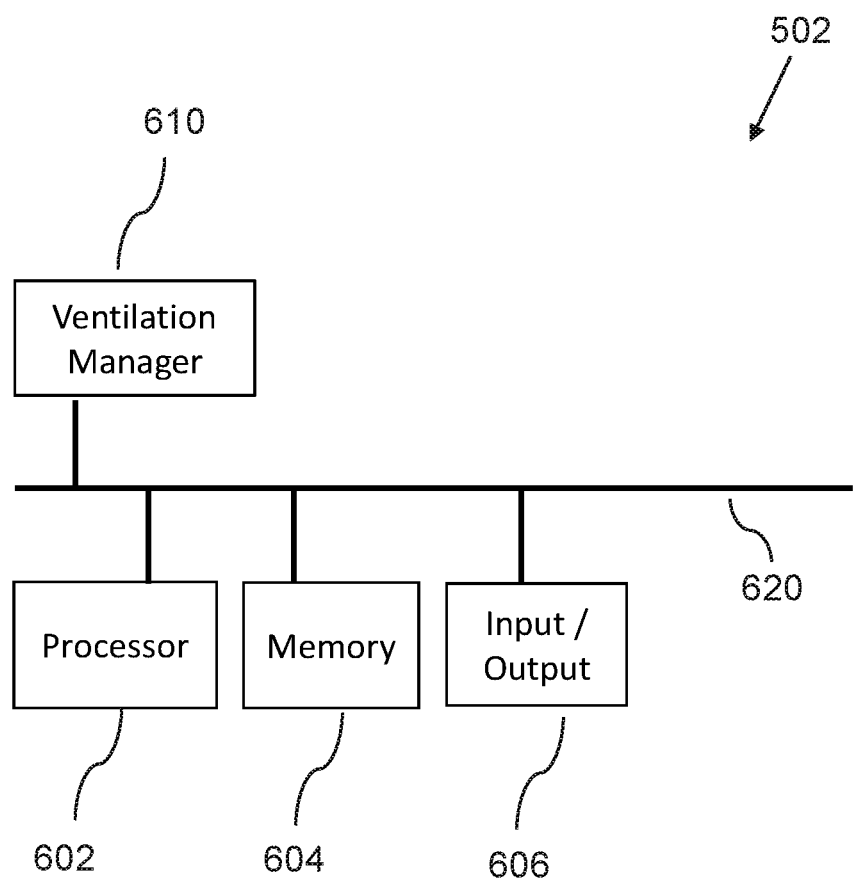
FIG. 6 is a schematic diagram illustrating a ventilation control unit, according to an embodiment of the invention.

In a related embodiment, as shown in FIG. 6, a ventilation control unit 502 can include:

a) A processor 602;
b) A non-transitory memory 604;
c) An input/output component 606; and
d) A ventilation manager 610; all connected via
e) A data bus 620;

wherein the ventilation manager 610 is configured to control functions of the ventilation fan 152 and the ventilation pump 154.

In a further related embodiment, the ventilation control unit 502 can be configured to execute a ventilation program, such that the ventilation fan 152 is activated for a predetermined first time period and the ventilation pump 154 is activated for a predetermined second time period.

In a further related embodiment, the toilet 110 can further include a lid sensor 559, which is configured to detect an opening movement of the lid component 122 of the ventilatable toilet seat 120, such that the ventilation control unit 502 can be configured to activate the ventilation pump 154 when the opening movement of the lid component 122 is detected.

In a related embodiment, the lid sensor 559 can be a rotation sensor 559 that is mounted in a rotatable point 129 in the ventilatable toilet seat 120.

In a related embodiment, the lid sensor 559 can be a pressure sensor that is mounted in the ventilatable toilet seat 120.

In a related embodiment, the lid sensor 559 can be a contact sensor that is mounted in the ventilatable toilet seat 120, between the lid component 122 and the ventilatable seat component 124, such as contact on/off sensors commonly used in fridges and doors of cars.

In a further related embodiment, the ceiling ventilation unit 150 can further include a humidity sensor, such that the ventilation control unit 502 is configured to receive a humidity measurement of a humidity level in the room 180, such that the ventilation control unit 502 can be configured to activate the ventilation fan 152 when the humidity measurement exceeds a predetermined humidity threshold.

Figure 7:
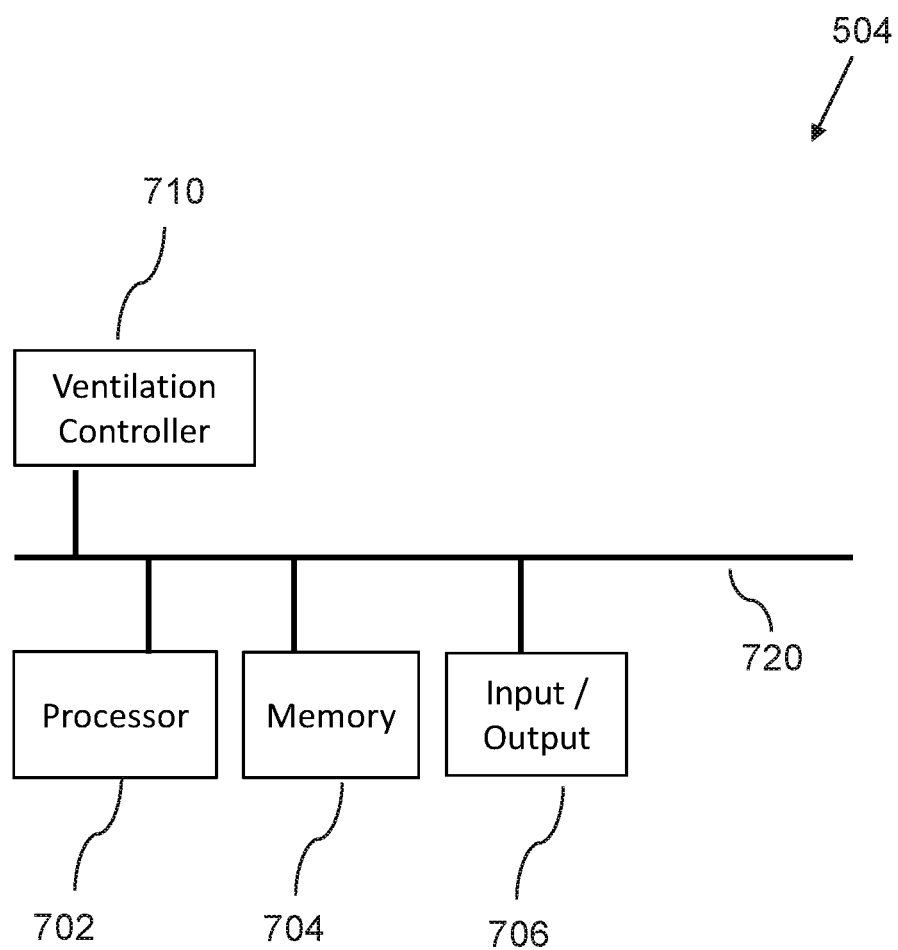
FIG. 7 is a schematic diagram illustrating a ventilation control device, according to an embodiment of the invention.

In a related embodiment, as shown in FIG. 7, a ventilation control device 504 can comprise:

a) A processor 702;
b) A non-transitory memory 704;
c) An input/output 706; and
d) A ventilation controller 710; all connected via
e) A data bus 720;

wherein the ventilation controller 710 is configured to monitor and control functions of the ventilation control unit 150.

In related embodiments, the ventilation control device 504 can include configurations as:

a) A mobile app, executing on a mobile device, such as for example an Android phone or iPhone, or any wearable mobile device;

b) A control panel for mounting on a wall;
c) A remote control hand-held device;
d) A web application, executing in a Web browser;
e) A tablet app, executing on a tablet device, such as for example an Android or iOS tablet device;
f) A desktop application, executing on a personal computer, or similar device;
g) An embedded application, executing on a processing device, such as for example a smart TV, a game console or other system.

Figure 8:
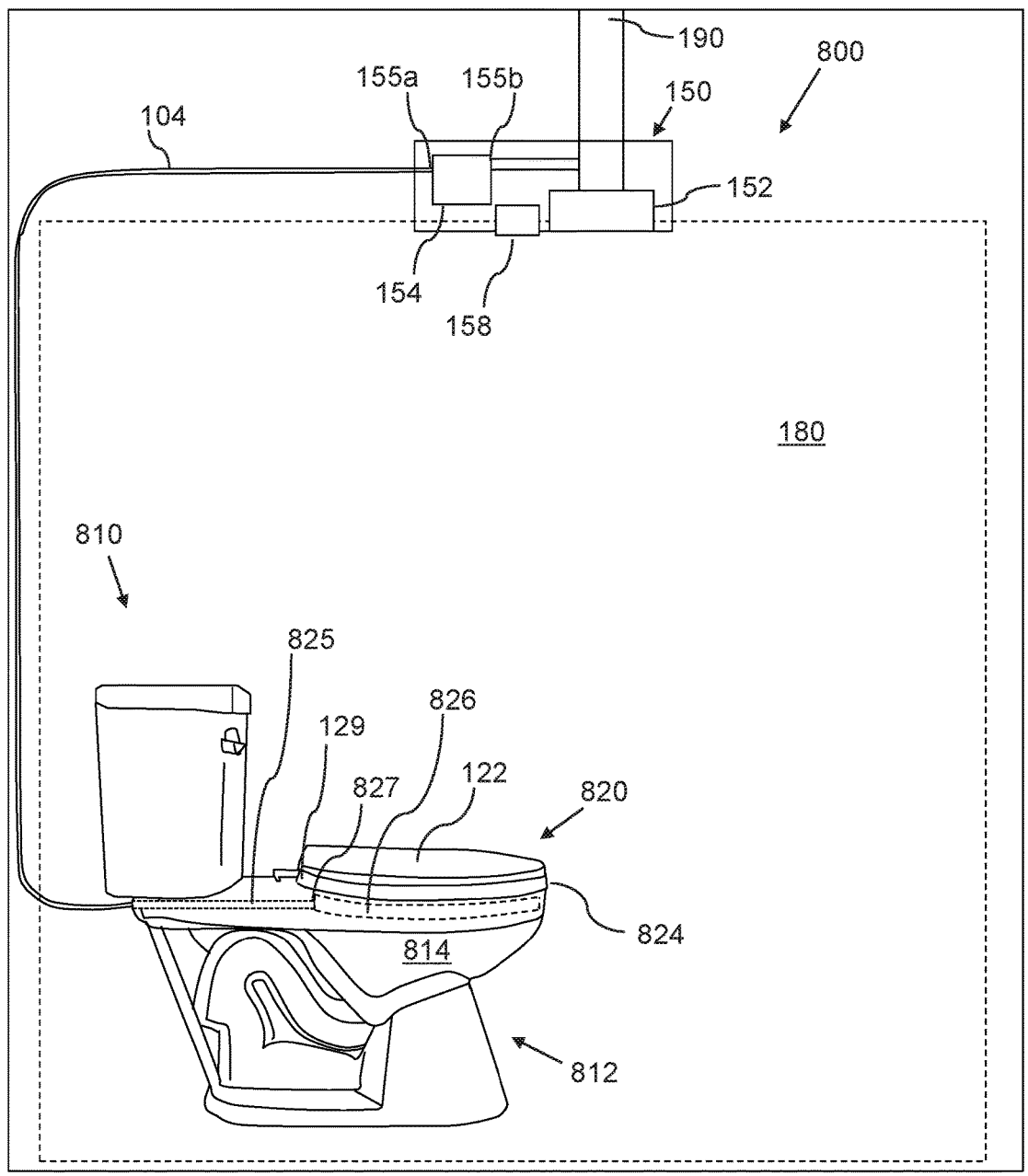
FIG. 8 is a schematic diagram illustrating a system for toilet ventilation, according to an embodiment of the invention.
Figure 9:
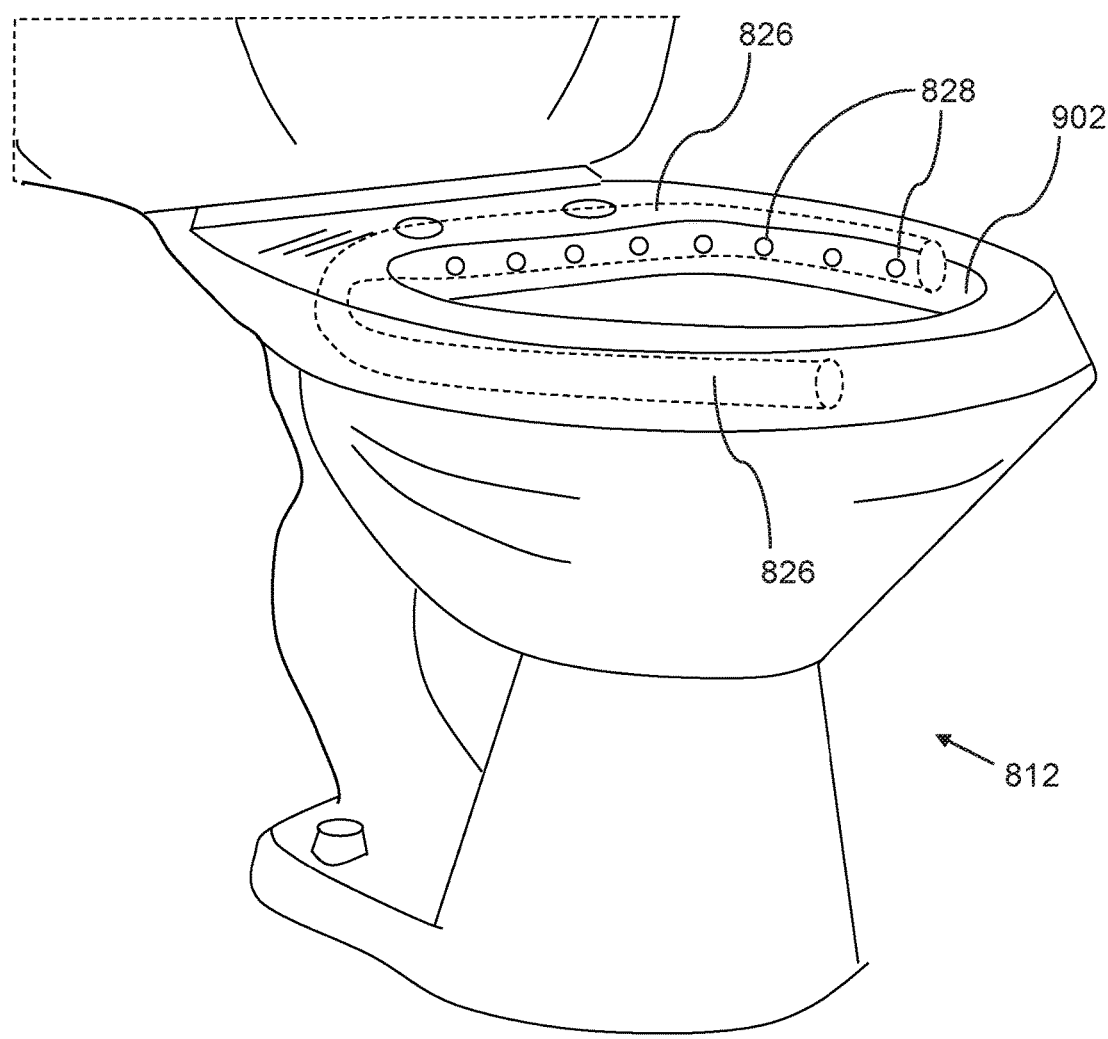
FIG. 9 is a perspective view illustrating a ventilatable toilet body, according to an embodiment of the invention.

In an embodiment, as shown in FIG. 8, a system for toilet ventilation 800 can include:

a) A ventilatable toilet 810, comprising:
i. A ventilatable toilet body 812, comprising:
a flush cavity 814; and
At least one ventilation channel 826, which is an elongated cavity which penetrates into the ventilatable toilet body 812 from a rear end of the ventilatable toilet body 812, such that the ventilatable toilet body 812 comprises a rear entry aperture 827 to the ventilation channel 826;
At least one ventilation aperture 828, as shown in FIG. 9, which is an aperture on an inner side of the flush cavity 814 of the ventilatable toilet body 812, which is configured to establish an airflow connection to the ventilation channel 826. As shown the ventilation aperture can be configured on an inner side of an upper rim of the ventilatable toilet body 812, which encircles an opening to the flush cavity 814;
ii. A toilet seat 820, comprising
A lid component 122; and
A seat component 824, such that the lid component 122 is rotatably connected to the seat component 824;
wherein the toilet seat 120 is mounted around the flush cavity 114 of the toilet;

b) A ventilation line 104, which is connected in a first end to the rear entry aperture 827 of the ventilation channel 826, for example via an intermediate channel 825 in a rear part of the ventilatable toilet body 812;

c) A ceiling ventilation unit 150, comprising:
i. A ventilation fan 152, which is configured to ventilate a room 180, such as a bathroom 180, such that the ventilation fan 152 is connected to a ventilation shaft 190;
ii. A ventilation pump 154, comprising:
an input connection 155*a*, which is connected to a second end of the ventilation line 104; and
an output connection 155*b*, which is connected to the ventilation shaft 190;

wherein the ventilation fan 152 is configured to ventilate the room 180; and wherein the ventilatable toilet body 812 is configured to ventilate the toilet 110, whereby an emission of odors from the toilet 110 can be reduced.

Figure 10:
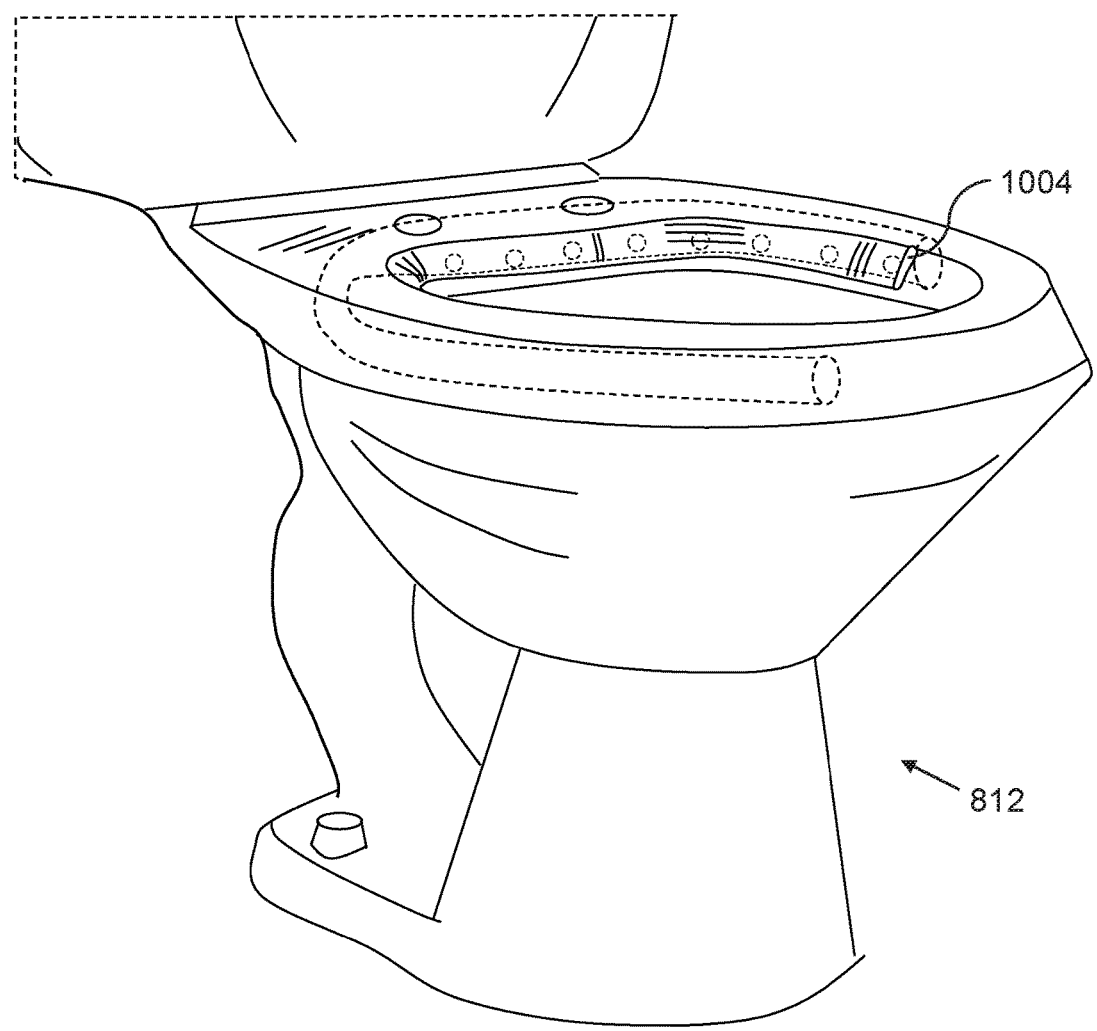
FIG. 10 is a perspective view illustrating a ventilatable toilet body, according to an embodiment of the invention.

In a related embodiment, FIG. 9 shows an upper perspective view of a part of the ventilatable toilet body 812, showing the ventilation apertures 828, which connect to the ventilation channel 826, such that the ventilation apertures 828 are positioned on an inner side of an upper rim 902 of the ventilatable toilet body 812, which encircles an opening to the flush cavity 814;

In a related embodiment, as shown in FIG. 10, the ventilatable toilet body 812 can further include an upper lip 1004, which can also be called an upper overhang 1004, which protrudes inward and downward from an upper part of the upper rim 902, such that the upper lip 1004 shields the ventilation apertures from direct exposure and visibility, thereby reducing a risk that liquids are allowed to enter the ventilation channel 826.

Figure 11:
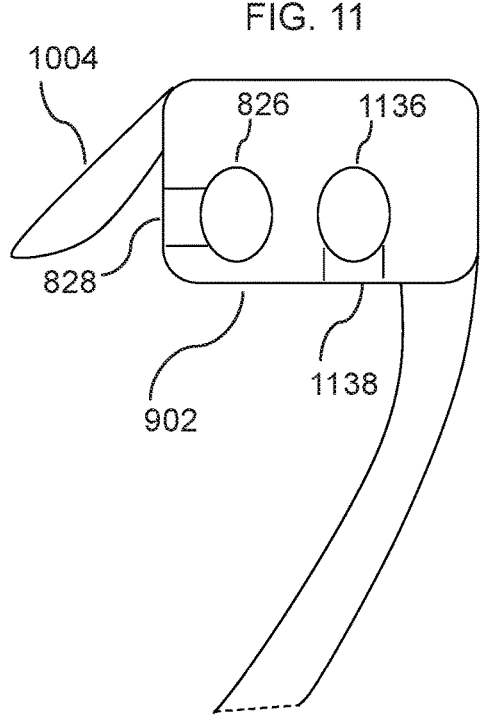
FIG. 11 is a front cross-sectional view illustrating an upper rim of a ventilatable toilet body, according to an embodiment of the invention.

FIG. 11 illustrates a front cross-sectional view of the embodiment shown in FIG. 10, further showing a conventional position of a water flush channel 1136, inside the upper rim 902, and a water flush aperture 1138, which is connected to the water flush channel 1136, and positioned on a bottom side of the upper rim 902.

Figure 12:
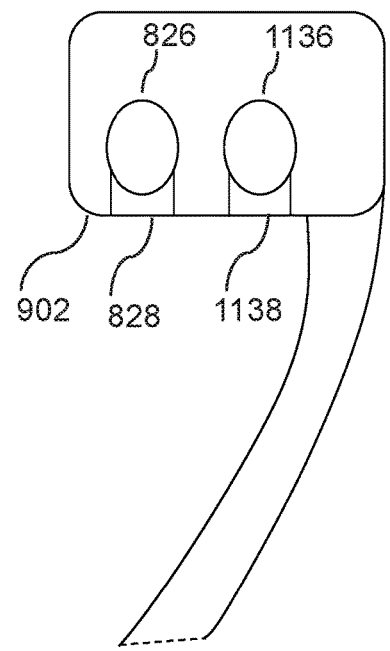
FIG. 12 is a front cross-sectional view illustrating an upper rim of a ventilatable toilet body, according to an embodiment of the invention.

In an alternative embodiment, as shown in FIG. 12, the ventilation apertures 828 can be positioned on the bottom side of the upper rim 902, inward to the water flush aperture 1138, such that there is no need for an upper lip 1004.

In another related embodiment, as shown in FIG. 13, the ventilatable toilet body 812 can further include a lateral distribution channel 1330, which is an elongated cavity reaching from a right to a left side inside the ventilatable toilet body, mounted behind the ventilation channel 826;
such that the lateral distribution channel 1330 is connected to a rear center of the ventilation channel 826, to permit a uniform air flow through the ventilation apertures 228 (not visible in FIG. 13);
such that the rear entry aperture 127, can be connected to the lateral distribution channel 1330, as a right rear entry aperture 1327a, or a left rear entry aperture 1327b, which are positioned in respectively right and left ends of the lateral distribution channel 1330;
whereby the lateral distribution channel 1330 permits a rear right or left side connection of the ventilation line 104, while allowing a uniform airflow through the ventilation apertures 228.

FIG. 13 shows a right side connection, such that the ventilation line 104 is connected to a right rear entry aperture 1327a, and a left rear entry aperture 1327b is capped with a plug 232.

In related embodiments, the lateral distribution channel 1330 can be directly connected to the ventilation channel 826, or can be connected via a connection channel 1340.

It shall be understood that an executing instance of an embodiment of the system for ventilation control 500, as shown in FIG. 5, can include a plurality of ventilation control devices 504, which are each tied to one or more users 522.

FIGS. 5, 6 and 7 are block diagrams and flowcharts, methods, devices, systems, apparatuses, and computer program products according to various embodiments of the present invention. It shall be understood that each block or step of the block diagram, flowchart and control flow illustrations, and combinations of blocks in the block diagram, flowchart and control flow illustrations, can be implemented by computer program instructions or other means. Although computer program instructions are discussed, an apparatus or system according to the present invention can include other means, such as hardware or some combination of hardware and software, including one or more processors or controllers, for performing the disclosed functions.

In this regard, FIGS. 5, 6 and 7 depict the computer devices of various embodiments, each containing several of the key components of a general-purpose computer by which an embodiment of the present invention may be implemented. Those of ordinary skill in the art will appreciate that a computer can include many components. However, it is not necessary that all of these generally conventional components be shown in order to disclose an illustrative embodiment for practicing the invention. The general-purpose computer can include a processing unit and a system memory, which may include various forms of non-transitory storage media such as random access memory (RAM) and read-only memory (ROM). The computer also may include nonvolatile storage memory, such as a hard disk drive, where additional data can be stored.

It shall be understood that the above-mentioned components of the ventilation control unit 502 and the ventilation control device 504 are to be interpreted in the most general manner.

For example, the processors 602 702, can each respectively include a single physical microprocessor or microcontroller, a cluster of processors, a datacenter or a cluster of datacenters, a computing cloud service, and the like.

In a further example, the non-transitory memory 604 and the non-transitory memory 704 can each respectively include various forms of non-transitory storage media, including random access memory and other forms of dynamic storage, and hard disks, hard disk clusters, cloud storage services, and other forms of long-term storage. Similarly, the input/output 606 and the input/output 706 can each respectively include a plurality of well-known input/output devices, such as screens, keyboards, pointing devices, motion trackers, communication ports, and so forth.

Furthermore, it shall be understood that the ventilation control unit 502 and the ventilation control device 504 can each respectively include a number of other components that are well known in the art of general computer devices, and therefore shall not be further described herein. This can include system access to common functions and hardware, such as for example via operating system layers such as Windows, Linux, and similar operating system software, but can also include configurations wherein application services are executing directly on server hardware or via a hardware abstraction layer other than a complete operating system.

An embodiment of the present invention can also include one or more input or output components, such as a mouse, keyboard, monitor, and the like. A display can be provided for viewing text and graphical data, as well as a user interface to allow a user to request specific operations. Furthermore, an embodiment of the present invention may be connected to one or more remote computers via a network interface. The connection may be over a local area network (LAN) wide area network (WAN), and can include all of the necessary circuitry for such a connection.

In a related embodiment, the ventilation control unit 502 and the communicates with the ventilation control device 504 over a network 506, which can include the general Internet, a Wide Area Network or a Local Area Network, or another form of communication network, transmitted on wired or wireless connections. Wireless networks can for example include Ethernet, Wi-Fi, Bluetooth, ZigBee, and NFC. The communication can be transferred via a secure, encrypted communication protocol.

Typically, computer program instructions may be loaded onto the computer or other general-purpose programmable machine to produce a specialized machine, such that the instructions that execute on the computer or other programmable machine create means for implementing the functions specified in the block diagrams, schematic diagrams or flowcharts. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the block diagrams, schematic diagrams or flowcharts.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the block diagram, schematic diagram, flowchart block or step.

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagrams, schematic diagrams or flowcharts, as well as combinations of blocks or steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touch screen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

Here has thus been described a multitude of embodiments of the ventilation control unit 502, the ventilation control device 504, and methods related thereto, which can be employed in numerous modes of usage.

The many features and advantages of the invention are apparent from the detailed specification, and thus, it is intended by the appended claims to cover all such features and advantages of the invention, which fall within the true spirit and scope of the invention.

For example, alternative embodiments can reconfigure or combine the components of the ventilation control unit 502 and the ventilation control device 504. Parts or all of the components of the ventilation control device 504 can be configured to operate in the ventilation control unit 502, whereby the ventilation control device 504 for example can function as a thin client, performing only graphical user interface presentation and input/output functions. Alternatively, parts or all of the components of the ventilation control unit 502 can be configured to operate in the ventilation control device 504.

Many such alternative configurations are readily apparent, and should be considered fully included in this specification and the claims appended hereto. Accordingly, since numerous modifications and variations will readily occur to those skilled in the art, it is not desired to limit the invention to the exact construction and operation illustrated and described, and thus, all suitable modifications and equivalents may be resorted to, falling within the scope of the invention.

What is claimed is:

1. A system for toilet ventilation, comprising:
    a) a ventilatable toilet, comprising:
        a toilet body, comprising a flush cavity;
        at least one ventilation channel, which is an elongated cavity inside the ventilatable toilet, such that the ventilatable toilet comprises a rear entry aperture, which connects to the at least one ventilation channel; and
        at least one ventilation aperture, which is configured to establish an airflow connection from the flush cavity to the at least one ventilation channel;
    b) a ventilation line, which is connected in a first end to the rear entry aperture; and
    c) a ceiling ventilation unit, comprising:
        a ventilation fan, which is configured to ventilate a room, such that the ventilation fan is configured to connect to a ventilation shaft;
        a ventilation pump, comprising:
            an input connection, which is connected to a second end of the ventilation line; and
            an output connection, which is connected to the ventilation shaft; and
        a ventilation control unit, which is connected to the ventilation fan and the ventilation pump, wherein the ventilation unit comprises:
            a processor;
            a non-transitory memory;
            an input/output component; and
            a ventilation manager; all connected via
            a data bus;
            wherein the ventilation manager is configured to control functions of the ventilation fan and the ventilation pump;
    wherein the ventilation control unit is configured to execute a ventilation program, such that the ventilation fan is activated for a predetermined first time period and the ventilation pump is activated for a predetermined second time period;
    wherein the ventilation fan is configured to ventilate the room; and
    wherein the ventilatable toilet is configured to ventilate, whereby an emission of odors from the toilet is reduced.

2. The system for toilet ventilation of claim 1, wherein the ventilatable toilet further comprises:
    a ventilatable toilet seat, comprising
        a lid component; and
        a ventilatable seat component, such that the lid component is rotatably connected to the ventilatable seat component, the ventilatable seat component further comprising:
            the at least one ventilation channel, which is an elongated cavity which penetrates into the seat component from a rear end of the seat component, such that the ventilatable seat component comprises the rear entry aperture, which connects to the at least one ventilation channel; and
            the at least one ventilation aperture, which is an aperture on a bottom side of the seat component, which is configured to establish an airflow connection to the at least one ventilation channel;
    wherein the ventilatable toilet seat is mounted around the flush cavity of the toilet;
    wherein the ventilatable toilet seat is configured to ventilate the ventilatable toilet,
    whereby an emission of odors from the ventilatable toilet is reduced.

3. The system for toilet ventilation of claim 2, wherein the at least one ventilation aperture comprises a plurality of ventilation apertures, and wherein the at least one ventilation channel is configured to extend around the ventilatable seat component, such that the at least one ventilation channel is configured with an ellipsoid shape, such that the plurality of ventilation apertures are distributed along the at least one ventilation channel.

4. The system for toilet ventilation of claim 2, wherein the seat component further comprises:
   a) the at least one ventilation channel, further comprising:
      a first ventilation channel; and
      a second ventilation channel; and
   b) the at least one ventilation aperture, further comprising:
      a first plurality of ventilation apertures, which are apertures on a bottom side of the seat component, such that each ventilation aperture in the first plurality of ventilation apertures is configured to establish an airflow connection to the first ventilation channel, such that the first plurality of ventilation apertures is arranged in a linear array from a rear to a front of the seat component; and
      a second plurality of ventilation apertures, which are apertures on a bottom side of the seat component, such that each ventilation aperture in the second plurality of ventilation apertures is configured to establish an airflow connection to the second ventilation channel, such that the second plurality of ventilation apertures is arranged in a linear array from a rear to a front of the seat component.

5. The system for toilet ventilation of claim 4, wherein the ventilation line further comprises a t-connector, such that the first end of the ventilation line is split into right and left ventilation lines, which are connected to respectively the first and second ventilation channels.

6. The system for toilet ventilation of claim 2, wherein the ventilatable toilet further comprises:
   a ventilation control unit, which is connected to the ventilation fan and the ventilation pump; and
   a lid sensor, which is configured to detect an opening movement of the lid component of the ventilatable toilet seat;
   wherein the ventilation control unit is configured to control functions of the ventilation fan and the ventilation pump;
   wherein the ventilation control unit is configured to activate the ventilation pump when the opening movement of the lid component is detected.

7. The system for toilet ventilation of claim 6, wherein the lid sensor is a rotation sensor that is mounted in a rotatable point in the ventilatable toilet seat.

8. The system for toilet ventilation of claim 6, wherein the lid sensor is a contact sensor that is mounted in the ventilatable toilet seat, between the lid component and the ventilatable seat component.

9. The system for toilet ventilation of claim 2, wherein the seat component further comprises:
   a lateral distribution channel, which is an elongated cavity configured to reach from a right to a left side inside the ventilatable toilet seat, such that the lateral distribution channel is mounted behind the at least one ventilation channel;
   wherein the lateral distribution channel is connected to a rear center of the at least one ventilation channel;
   such that the rear entry aperture comprises a right rear entry aperture and a left rear entry aperture, which are positioned to connect to respectively right and left ends of the lateral distribution channel;
   whereby the lateral distribution channel permits a rear right or left side connection of the ventilation line, while allowing a uniform airflow through the at least one ventilation aperture.

10. The system for toilet ventilation of claim 1, wherein the at least one ventilation aperture further comprises a plurality of ventilation apertures arranged in a linear array, such that aperture diameter increases from a rear ventilation aperture to a front ventilation aperture, such that the plurality of ventilation apertures is configured to create a substantially uniform ventilation suction from a rear ventilation aperture to a front ventilation aperture.

11. The system for toilet ventilation of claim 1, further comprising:
   a ventilation control device, which is connected to the ventilation control unit;
   wherein the ventilation control device is configured to monitor and control functions of the ventilation control unit.

12. The system for toilet ventilation of claim 7, wherein the ceiling ventilation unit further comprises:
   a humidity sensor, such that the ventilation control unit is configured to receive a humidity measurement of a humidity level in the room;
   wherein the ventilation control unit is configured to activate the ventilation fan when the humidity measurement exceeds a predetermined humidity threshold.

13. The system for toilet ventilation of claim 1, wherein the toilet body is configured as a ventilatable toilet body, further comprising:
   the at least one ventilation channel, which is an elongated cavity which penetrates into the ventilatable toilet body from a rear end of the ventilatable toilet body, such that the ventilatable toilet body comprises the rear entry aperture, which connects to the at least one ventilation channel;
   the at least one ventilation aperture, which is an aperture on an inner side of the flush cavity of the ventilatable toilet body, which is configured to establish an airflow connection to the at least one ventilation channel;
   wherein the ventilatable toilet body is configured to ventilate the ventilatable toilet, whereby an emission of odors from the ventilatable toilet is reduced.

14. The system for toilet ventilation of claim 13, wherein the ventilatable toilet body further comprises:
   an upper rim, which encircles an opening to the flush cavity;
   such that the at least one ventilation aperture is positioned on an inner side of the upper rim.

15. The system for toilet ventilation of claim 14, wherein the ventilatable toilet body further comprises:
   an upper lip, which protrudes inward and downward from an upper part of the upper rim;
   such that the upper lip is configured to shield the at least one ventilation aperture.

16. The system for toilet ventilation of claim 13, wherein the ventilatable toilet body further comprises:
   a lateral distribution channel, which is an elongated cavity configured to reach from a right to a left side inside the ventilatable toilet body, such that the lateral distribution channel is mounted behind the at least one ventilation channel;
   wherein the lateral distribution channel is connected to a rear center of the at least one ventilation channel;
   such that the rear entry aperture comprises a right rear entry aperture and a left rear entry aperture, which are positioned in respectively right and left ends of the lateral distribution channel;

whereby the lateral distribution channel permits a rear right or left side connection of the ventilation line, while allowing a uniform airflow through the at least one ventilation aperture.

17. A system for toilet ventilation, comprising:
a ventilatable toilet seat, comprising:
  a lid component; and
  a ventilatable seat component, such that the lid component is rotatably connected to the ventilatable seat component, the ventilatable seat component further comprising:
    at least one ventilation channel, which is an elongated cavity which penetrates into the seat component from a rear end of the seat component, such that the seat component comprises a rear entry aperture, which connects to the at least one ventilation channel;
    at least one ventilation aperture, which is an aperture on a bottom side of the seat component, which is configured to establish an airflow connection to the at least one ventilation channel; and
a ceiling ventilation unit, comprising:
  a ventilation fan, which is configured to ventilate a room, such that the ventilation fan is configured to connect to a ventilation shaft;
  a ventilation pump, comprising:
    an input connection, which is connected to a second end of the ventilation channel; and
    an output connection, which is connected to the ventilation shaft; and
  a ventilation control unit, which is connected to the ventilation fan and the ventilation pump, wherein the ventilation unit comprises:
    a processor;
    a non-transitory memory;
    an input/output component; and
    a ventilation manager; all connected via a data bus;
    wherein the ventilation manager is configured to control functions of the ventilation fan and the ventilation pump;
  wherein the ventilation control unit is configured to execute a ventilation program, such that the ventilation fan is activated for a predetermined first time period and the ventilation pump is activated for a predetermined second time period;
  wherein the ventilation fan is configured to ventilate the room; and
  wherein the ventilatable toilet seat is configured to ventilate, whereby an emission of odors is reduced.

18. The system for toilet ventilation of claim 17, further comprising:
a ventilation line, which is connected in a first end to the rear entry aperture.

19. The system for toilet ventilation of claim 17, wherein the at least one ventilation aperture comprises a plurality of ventilation apertures, and wherein the at least one ventilation channel is configured to extend around the ventilatable seat component, such that the plurality of ventilation apertures are distributed along the at least one ventilation channel.

20. The system for toilet ventilation of claim 17, wherein the seat component further comprises:
a) the at least one ventilation channel, further comprising:
  a first ventilation channel; and
  a second ventilation channel;
b) the at least one ventilation aperture, further comprising:
  a first plurality of ventilation apertures, which are apertures on a bottom side of the seat component, such that each ventilation aperture in the first plurality of ventilation apertures is configured to establish an airflow connection to the first ventilation channel, such that the first plurality of ventilation apertures is arranged in a linear array from a rear to a front of the seat component; and
  a second plurality of ventilation apertures, which are apertures on a bottom side of the seat component, such that each ventilation aperture in the second plurality of ventilation apertures is configured to establish an airflow connection to the second ventilation channel, such that the second plurality of ventilation apertures is arranged in a linear array from a rear to a front of the seat component.

21. The system for toilet ventilation of claim 17, wherein the ventilation line further comprises a t-connector, such that the first end of the ventilation line is split into right and left ventilation lines, which are connected to respectively the first and second ventilation channels.

22. The system for toilet ventilation of claim 17, wherein the at least one ventilation aperture further comprises a plurality of ventilation apertures arranged in a linear array, such that aperture diameter increases from a rear ventilation aperture to a front ventilation aperture, such that the plurality of ventilation apertures is configured to create a substantially uniform ventilation suction from a rear ventilation aperture to a front ventilation aperture.

23. A system for toilet ventilation, comprising:
a ceiling ventilation unit, comprising:
  a ventilation fan, which is configured to ventilate a room, such that the ventilation fan is configured to connect to a ventilation shaft;
  a ventilation pump, comprising:
    an input connection, which is configured to connect to a ventilatable toilet; and
    an output connection, which is configured to connect to the ventilation shaft; and
  a ventilation control unit, which is connected to the ventilation fan and the ventilation pump, wherein the ventilation unit comprises:
    a processor;
    a non-transitory memory;
    an input/output component; and
    a ventilation manager; all connected via a data bus;
    wherein the ventilation manager is configured to control functions of the ventilation fan and the ventilation pump;
wherein the ventilation control unit is configured to execute a ventilation program, such that the ventilation fan is activated for a predetermined first time period and the ventilation pump is activated for a predetermined second time period;
such that the ventilation fan is configured to ventilate the room; and
such that the ventilation pump is configured to ventilate the ventilatable toilet, whereby an emission of odors from the ventilatable toilet is reduced.

24. The system for toilet ventilation of claim 23, wherein the ceiling ventilation unit further comprises:
a humidity sensor, such that the ventilation control unit is configured to receive a humidity measurement of a humidity level in the room;

wherein the ventilation control unit is configured to activate the ventilation fan when the humidity measurement exceeds a predetermined humidity threshold.

25. The system for toilet ventilation of claim 24, wherein the ventilation control unit is configured to communicate with the humidity sensor, such that the ventilation control unit is configured to receive a humidity measurement of a humidity level in the room.

26. The system for toilet ventilation of claim 25, wherein the ventilation control unit is configured to activate the ventilation fan when the humidity measurement exceeds a predetermined humidity threshold.

27. The system for toilet ventilation of claim 23, wherein the ventilation control unit is configured to communicate with a lid sensor in a toilet; wherein the ventilation control unit is configured to activate the ventilation pump when an opening movement of the lid component is detected in communication with the lid sensor.

\* \* \* \* \*